(12) United States Patent
Yan

(10) Patent No.: US 7,889,478 B2
(45) Date of Patent: Feb. 15, 2011

(54) ELECTRICITY CONDUCTING WHEEL STRUCTURE

(76) Inventor: Li-Lan Yan, No. 36-1, Siaokang Lang, Puzih City, Chiayi County (TW)

( * ) Notice: Subject to any disclaimer, the term of this patent is extended or adjusted under 35 U.S.C. 154(b) by 215 days.

(21) Appl. No.: 12/320,500

(22) Filed: Jan. 28, 2009

(65) Prior Publication Data
US 2010/0188792 A1    Jul. 29, 2010

(51) Int. Cl.
*H05F 3/00* (2006.01)
(52) U.S. Cl. ..................................................... 361/221
(58) Field of Classification Search .................. 361/221
See application file for complete search history.

(56) References Cited

U.S. PATENT DOCUMENTS

| | | | | |
|---|---|---|---|---|
| 1,682,899 A | * | 9/1928 | Fletcher | .......................... 152/7 |
| 1,797,545 A | * | 3/1931 | Churcher | .................... 152/151 |
| 2,267,503 A | * | 12/1941 | Lytle | .......................... 301/64.6 |
| 2,324,589 A | * | 7/1943 | Lytle | .......................... 301/64.6 |
| 2,686,891 A | * | 8/1954 | Burgin | .......................... 361/219 |
| 4,072,373 A | * | 2/1978 | Black | .......................... 384/537 |
| 6,139,040 A | * | 10/2000 | Dempsey | .................. 280/288.3 |
| 6,422,656 B2 | * | 7/2002 | Denner et al. | ............. 301/105.1 |
| 6,786,559 B1 | * | 9/2004 | Kidd et al. | .................. 301/5.23 |
| 7,406,989 B1 | * | 8/2008 | Casaus | ........................ 152/323 |

* cited by examiner

*Primary Examiner*—Ronald W Leja
(74) *Attorney, Agent, or Firm*—Rosenberg, Klein & Lee

(57) ABSTRACT

An electricity conducting wheel includes a wheel body, and an electricity conducting plate; the wheel body includes a bearing, a frame, and a conducting tire around the frame; the conducting plate is joined in the wheel body, with the bearing being held in a middle fitting hole thereof; the conducting plate has several conducting parts extending outwards from its fitting hole; the frame is directly joined on the bearing and the conducting parts of the conducting plate in an injection molding process thereof; the conducting plate has several fastening sections protruding from an outward end of each of the conducting parts; the fastening sections bend so that an angle exists between each of the conducting parts and each of the fastening sections; the tire is directly joined on the frame and the fastening sections of the conducting plate in another injection molding process, whereby the tire is formed.

7 Claims, 6 Drawing Sheets

ELECTRICITY CONDUCTING WHEEL STRUCTURE

BACKGROUND OF THE INVENTION

1. Field of the Invention

The present invention relates to an electricity conducting wheel, more particularly one, which has a relatively wide application, long service life and simple structure, and is convenient an economical to use.

2. Brief Description of the Prior Art

Patients are usually transported from a sick chamber with vehicles, e.g. wheelchairs and wheeled hospital beds, to the examination division to have a medical examination such as computerized axial tomography scan and nuclear magnetic resonance radiography.

However, when such vehicles are moving, static electricity will be produced thereon owing to the vehicles rubbing against other objects, especially in cold, dry, and low-humidity seasons, which static electricity will cause shock and discomfort to the patients on the vehicles. If a patient has a medical examination with a high-precision medical examination apparatus while resting on the vehicle, the static electricity will interfere with the medical examination apparatus. Consequently, errors are prone to happen to the outcome of the examination.

To overcome the above-mentioned problems, the inventor of the present invention developed an improvement on an electricity conducting roller structure, and an improvement on an electricity conducting wheel structure, which were taught in the present inventor's U.S. patent application Ser. Nos. 11/790,101 and 11/976,479 respectively. Both the above-mentioned electricity conducting wheels are to be fitted on the frame parts of the casters of a hospital bed/wheelchair to ground the static electricity carried on the hospital bed/wheelchair, thus preventing the static electricity from causing shock and discomfort to the patients or interfering with the medical examination.

However, the above-mentioned electricity conducting roller/wheel structures have the following drawbacks:

1. The manufacturers have to spend considerable amount of time and labor assembling the electricity conducting roller/wheel and joining the roller/wheel on the casters of a hospital bed/wheelchair. Therefore, the roller/wheel will cause a significant increase in the manufacturing cost of the casters.

2. The electricity conducting roller/wheel can only be installed on those casters that comprise two wheel bodies; in other words, the electricity conducting roller/wheel can't be used with those casters that have single wheel body, and therefore isn't convenient to use.

3. The electricity conducting roller/wheel has a smaller size than the casters of a hospital bed/wheelchair, and therefore is prone to get damaged when hitting against holes and bumps on an uneven floor/road.

Therefore, it is a main object of the present invention to provide an improvement on an electricity-conducting wheel structure to overcome the above problems.

SUMMARY OF THE INVENTION

An electricity conducting wheel in accordance with an embodiment of the present invention includes a wheel body, and an electricity conducting plate joined in the wheel body. The wheel body includes a bearing, a frame formed around the bearing, and an electricity conducting tire formed around the frame. The bearing is held in a middle fitting hole of the electricity conducting plate. The plate has several conducting parts extending outwards -from the fitting hole while the wheel frame was directly joined on the bearing and the conducting parts of the conducting plate in an injection molding process thereof. The plate has several fastening bending sections protruding from an outward end of each of the conducting parts; the tire was directly joined on the frame and the fastening sections of the conducting plate in an injection molding process thereof.

Therefore, the manufacturer doesn't have to spend much time and labor assembling the wheel of the present invention, and the wheel has a relatively simple structure, low manufacturing cost and wide application, and it is more convenient to use. Furthermore, the electricity conducting plate can't get damaged even if a hospital bed/wheelchair equipped with the wheel of the present invention is moving on an uneven floor/road.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
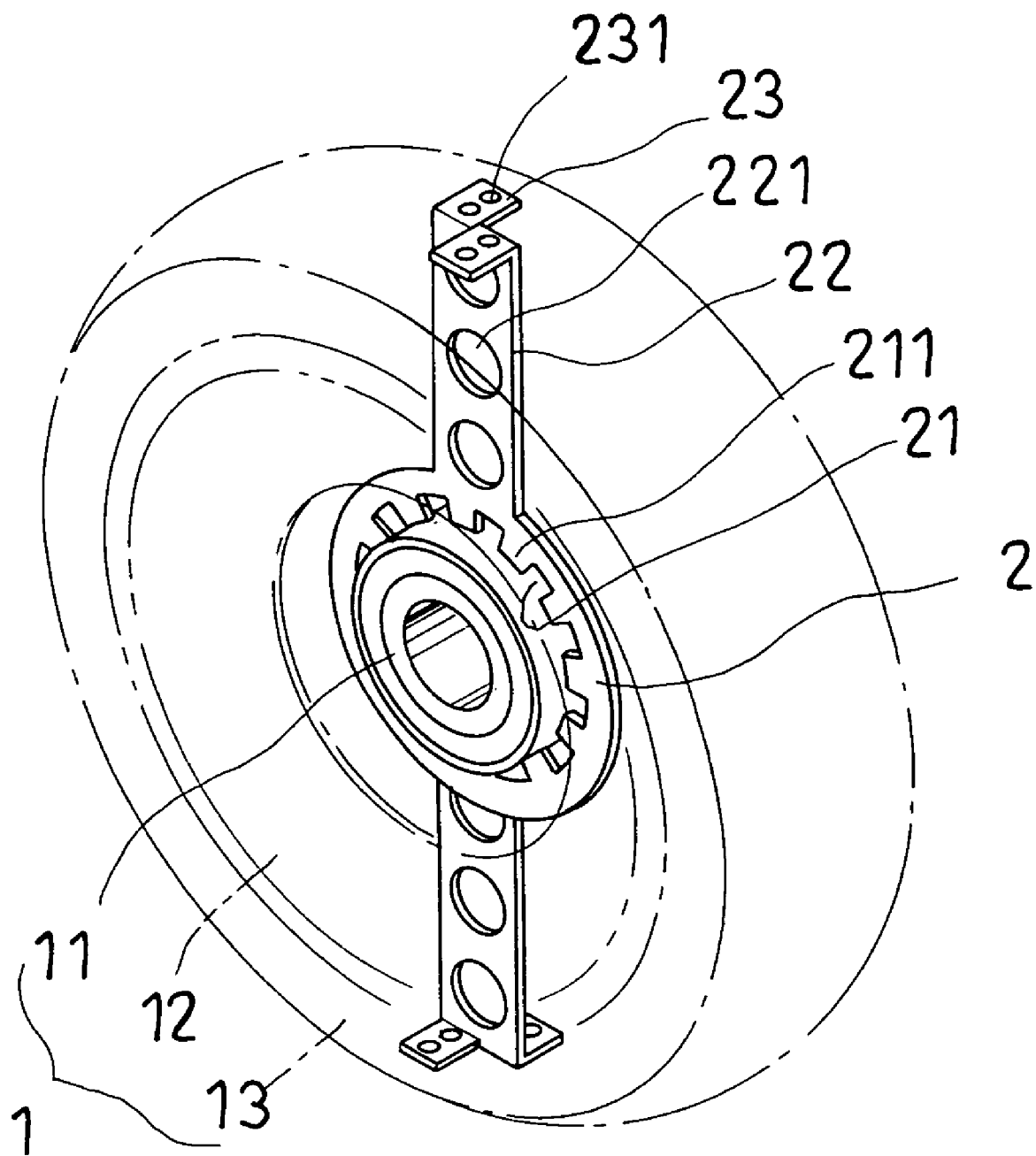
FIG. 1 is a perspective view of a first preferred embodiment of the present invention.
Figure 2:
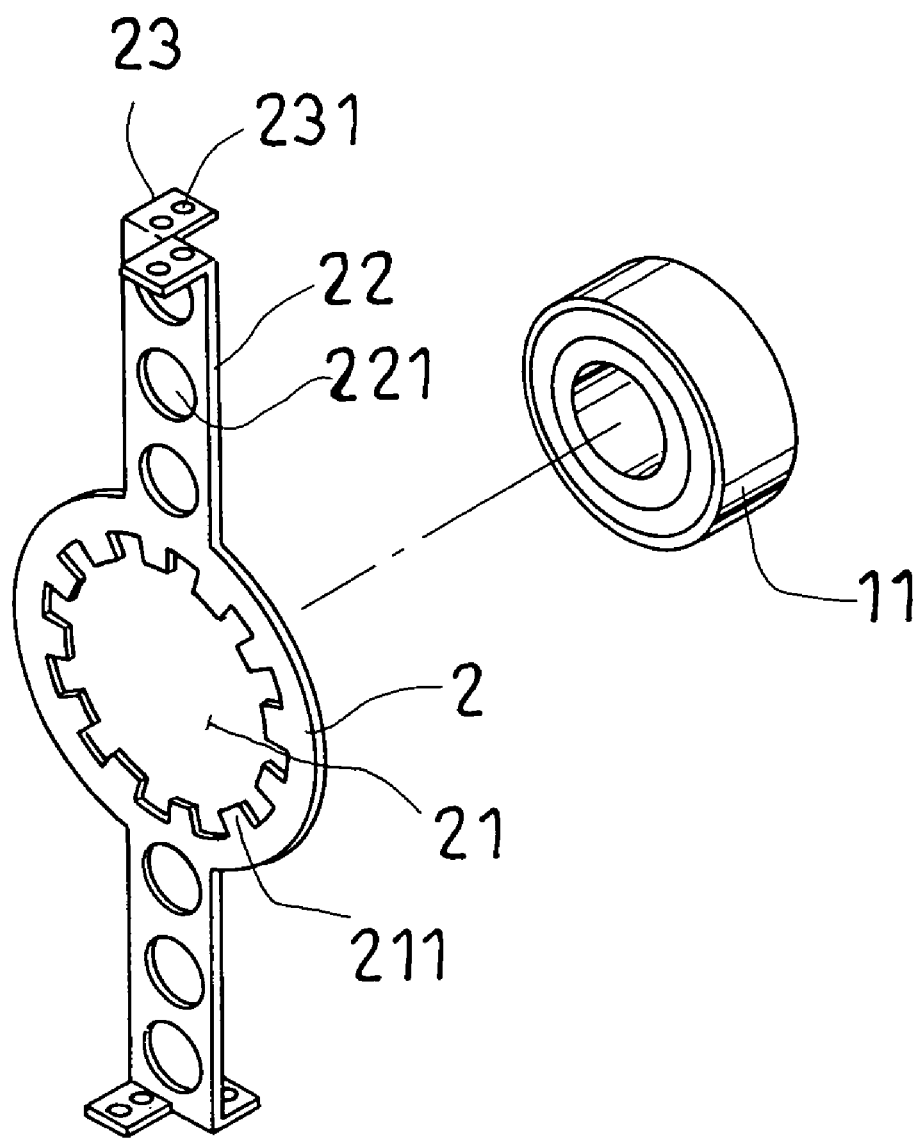
FIG. 2 is a fragmentary exploded perspective view of the first embodiment.
Figure 3:
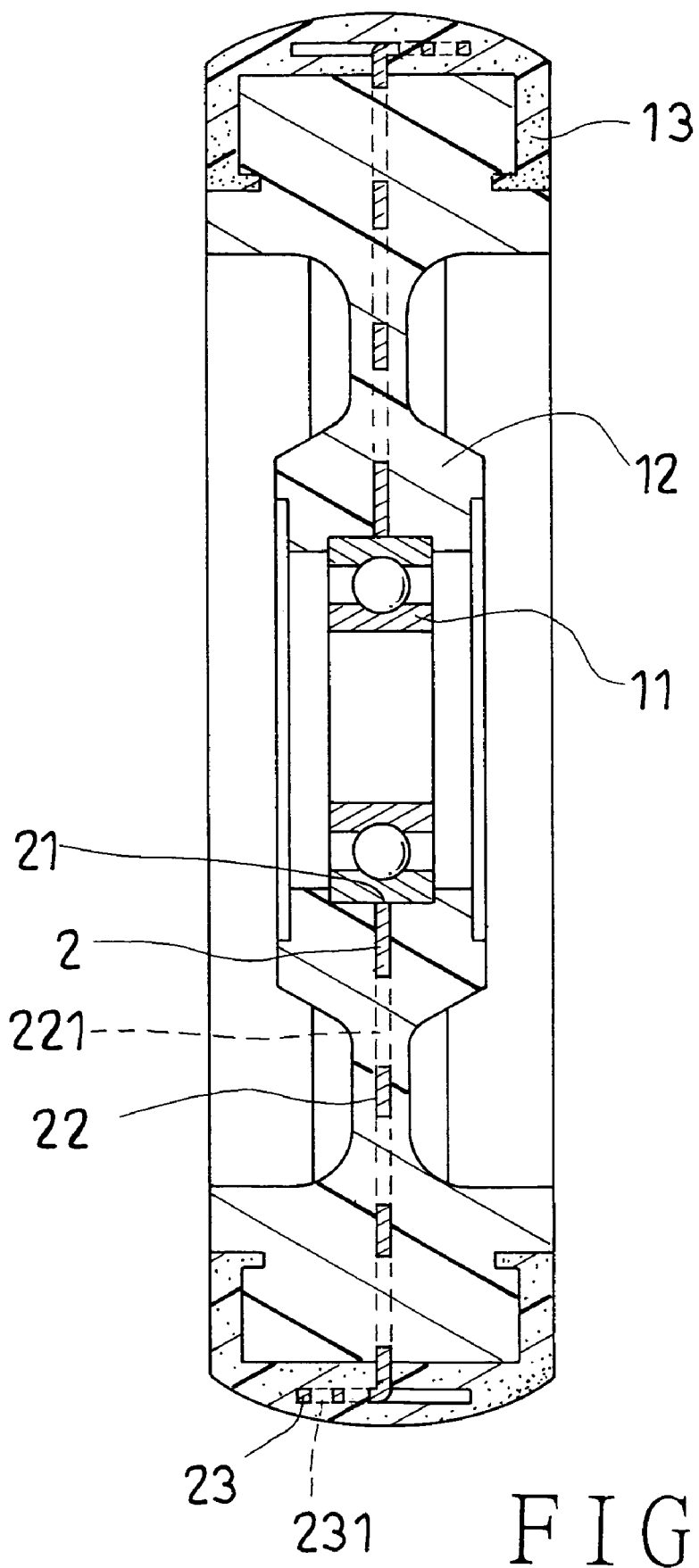
FIG. 3 is a sectional view of the first embodiment.
Figure 4:
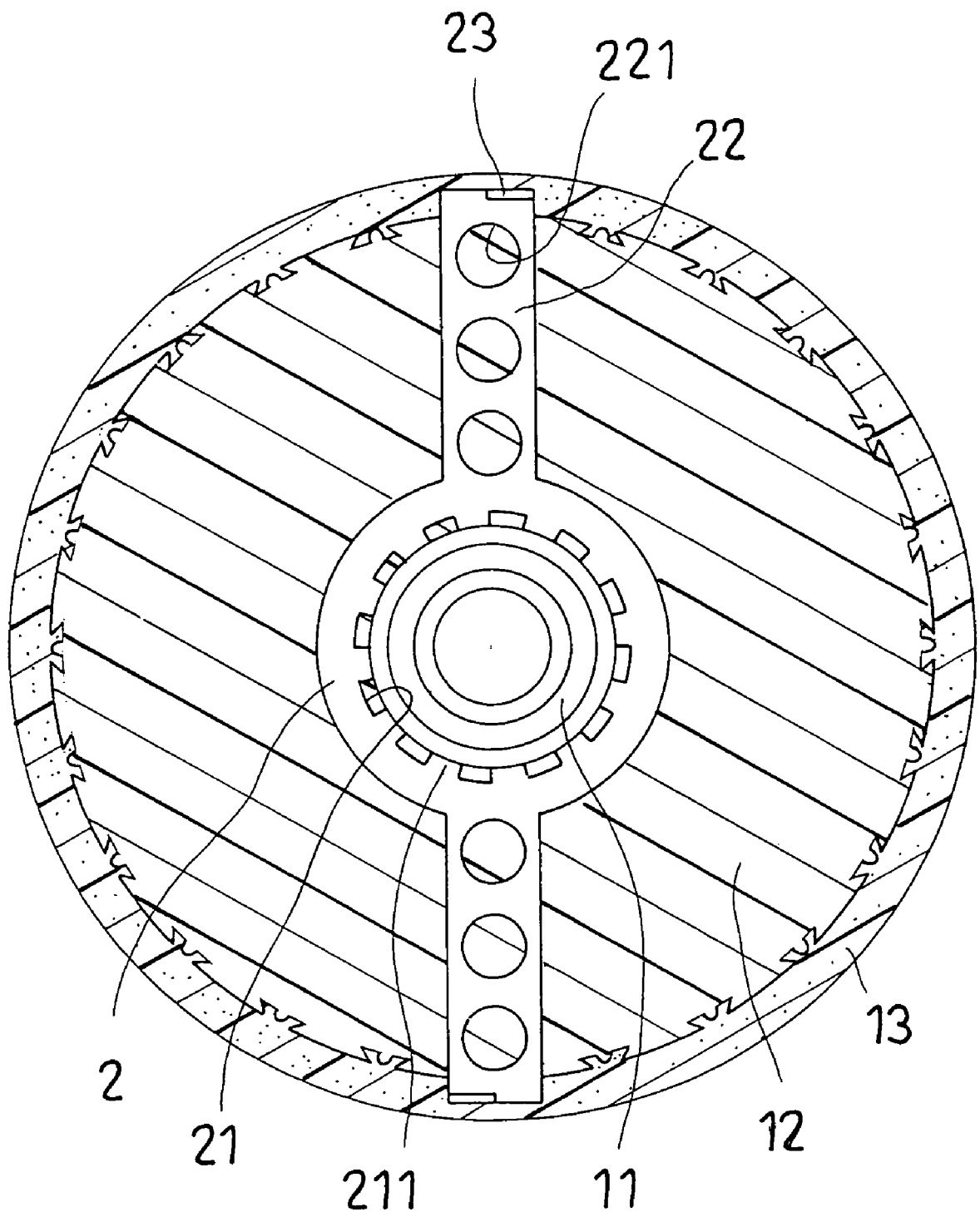
FIG. 4 is another sectional view of the first embodiment.

Referring to FIG. 1 to FIG. 4, a first preferred embodiment of an electricity conducting wheel of the present invention consists of a wheel body 1, and an electricity conducting plate 2.

The wheel body 1 consists of a bearing 11, a frame 12, and an electricity conducting tire 13. The bearing 11 is made of metallic materials.

The electricity conducting plate 2 has a middle fitting hole 21, two electricity conducting parts 22, which stick out from the middle fitting hole 21, and are aligned with each other; the middle fitting hole 21 has several fastening protrusions 211 spaced apart on an edge thereof; each of the electricity conducting parts 22 has several joining holes 221 thereon. Furthermore, the electricity conducting plate 2 has two fastening sections 23 sticking out from an outward end of each of the electricity conducting parts 22; the fastening sections 23 are formed in such manner that an angle exists between the electricity conducting part 22 and each of the fastening sections 23; the fastening sections 23 each have several joining holes 231 thereon.

The bearing 11 is securely joined in the middle fitting hole 21 of the electricity conducting plate 2, gripped by the fastening protrusions 211 formed on the edge of the middle fitting hole 21.

The frame 12 of the wheel body 1 covers the bearing 11 as well as the edge of middle fitting hole 21 and the electricity conducting parts 22 of the electricity conducting plate 2, with the fastening sections 23 sticking out from the frame 12.

The electricity conducting tire 13 covers an outward edge of the frame 12 as well as the fastening sections 23 of the electricity conducting plate 2.

The electricity conducting wheel is manufactured according to the following steps: first, the bearing 11 of the wheel body 1 is positioned in the fitting hole 21 of the electricity conducting plate 2 to be gripped by the fastening protrusions 211; second, an injection molding process is carried out so that the frame 12 is formed to cover the bearing 11 as well as the edge of the middle fitting hole 21 and the electricity conducting parts 22 of the electricity conducting plate 2; in the injection molding process, the injected material of the frame 12 will flow into the joining holes 221, and in turn the frame 12 will be securely joined to the electricity conducting parts 22 of the electricity conducting plate 2 afterwards; finally, another injection molding process is carried out so that the tire 13 is formed around the fastening sections 23 of the electricity conducting plate 2 as well as an outward circumference of the frame 12; in the injection molding process, the joining holes 231 of the fastening sections 23 will be filled with the injected material of the tire 13, and in turn the tire 13 will be securely joined to the fastening sections 23 of the electricity conducting plate 2 afterwards.

If static electricity is produced on the hospital bed or wheelchair, it will be grounded through the metallic bearing 11, the electricity conducting plate 2, and the tire 13.

Figure 5:
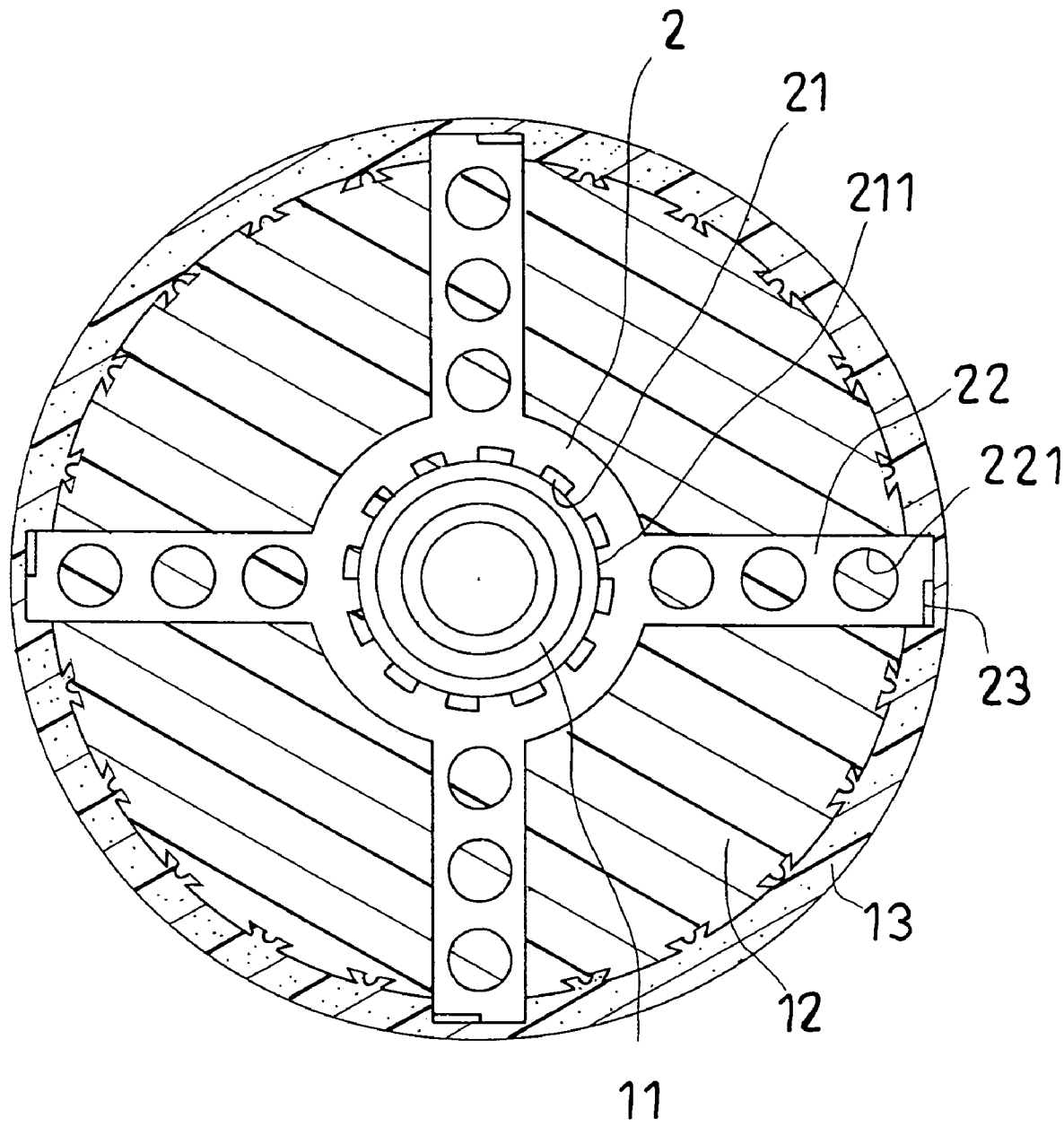
FIG. 5 is a sectional view of a second preferred embodiment.

Shown in FIG. 5 is a second preferred embodiment of an electricity conducting wheel of the invention, which includes an electricity conducting plate 2 having four radial electricity conducting parts 22; the electricity conducting parts 22 together form a pattern like a cross.

Figure 6:
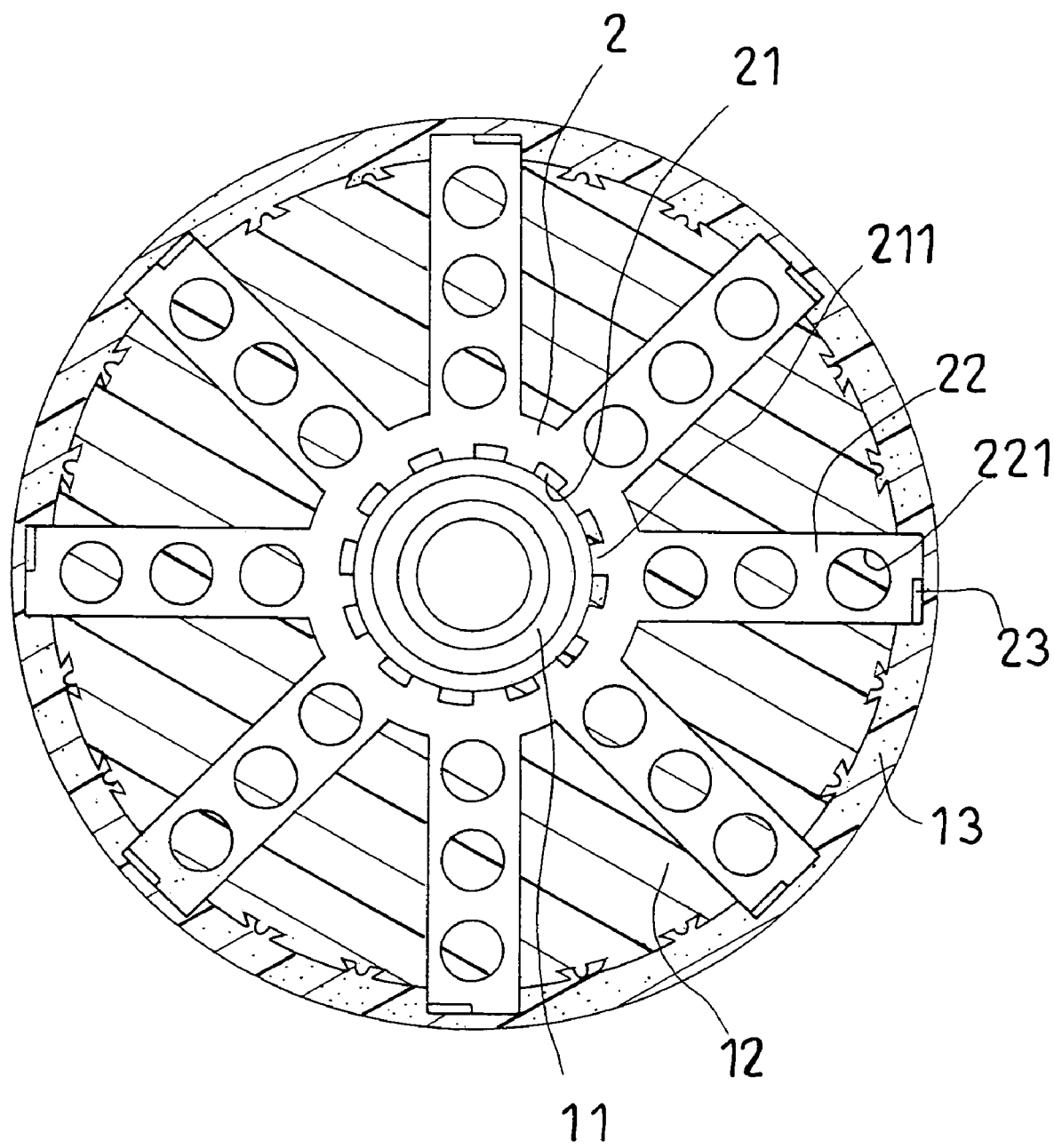
FIG. 6 is a sectional view of a third preferred embodiment.

Shown in FIG. 6 is a third preferred embodiment of an electricity conducting wheel of the invention, which includes an electricity conducting plate 2 having eight radial electricity conducting parts 22; the electricity conducting parts 22 together form a pattern like two intersecting crosses. The electricity conducting parts 22 of the electricity conducting plate 2 can be made in such a manner as to form other patterns besides the above-mentioned ones.

From the above description, it can be seen that the present invention has the following advantages over the prior arts:

1. The electricity conducting wheel of the present invention is a combination of a wheel body and an electricity conducting plate, which are directly joined together in the injection molding process for the frame and the tire of the wheel body. In other words, it takes less time and fewer steps to manufacture the present electricity conducting wheel, and in turn the manufacturing cost of the wheel will decrease.

2. Not only can the wheel structure of the present invention be applied to those hospital bed/wheelchair casters that comprise single wheel body, it can be applied to those hospital bed/wheelchair casters that comprise two wheel bodies. Therefore, the present invention has a wider application, and is more convenient to use.

3. The electricity conducting plate is wrapped in the wheel instead of being directly in contact with the floor to ground static electricity. Therefore, the electricity conducting plate can't get damaged even if a hospital bed/wheelchair equipped with the wheel of the present invention is moving on an uneven floor/road.

What is claimed is:

1. An improvement on an electricity conducting wheel structure, comprising
   (a) a wheel body; the wheel body including:
   a metallic bearing;
   a frame joined on the bearing; and
   an electricity conducting tire joined on the frame; and
   (b) an electricity conducting plate joined in the wheel body; the electricity conducting plate including:
   a fitting hole; the metallic bearing of the wheel body being held in the fitting hole;
   a plurality of electricity conducting parts extending outwards from the fitting hole; the frame of the wheel body being formed around and joined on the metallic bearing and the electricity conducting parts of the electricity conducting plate in an injection molding process thereof; and
   a plurality of fastening sections protruding from an outward end of each of the electricity conducting parts; the fastening sections bending such that an angle exists between each said electricity conducting part and each said fastening section; the electricity conducting tire being formed around and joined on the frame and the fastening sections of the electricity conducting plate in an injection molding process thereof.

2. The improvement on an electricity conducting wheel structure as claimed in claim 1, wherein the fitting hole of the electricity conducting plate has a plurality of fastening protrusions on an edge thereof.

3. The improvement on an electricity conducting wheel structure as claimed in claim 1, wherein the electricity conducting parts of the electricity conducting plate each have a plurality of joining holes thereon.

4. The improvement on an electricity conducting wheel structure as claimed in claim 1, wherein the fastening sections of the electricity conducting plate each have a plurality of joining holes thereon.

5. The improvement on an electricity conducting wheel structure as claimed in claim 1, wherein the electricity conducting parts of the electricity conducting plate together are in a shape of a straight line.

6. The improvement on an electricity conducting wheel structure as claimed in claim 1, wherein the electricity conducting parts of the electricity conducting plate together form a pattern like a cross.

7. The improvement on an electricity conducting wheel structure as claimed in claim 1, wherein the electricity conducting parts of the electricity conducting plate together form a pattern like two intersecting crosses.

* * * * *